(12) United States Patent
Rechberg

(10) Patent No.: US 7,152,892 B2
(45) Date of Patent: Dec. 26, 2006

(54) PUSH LATCH

(75) Inventor: Frank H. Rechberg, Corona, CA (US)

(73) Assignee: Actron Manufacturing, Inc., Corona, CA (US)

( * ) Notice: Subject to any disclaimer, the term of this patent is extended or adjusted under 35 U.S.C. 154(b) by 109 days.

(21) Appl. No.: 10/990,266

(22) Filed: Nov. 16, 2004

(65) Prior Publication Data

US 2006/0103148 A1 May 18, 2006

(51) Int. Cl.
*E05C 19/00* (2006.01)
*E05B 15/02* (2006.01)

(52) U.S. Cl. .................. 292/304; 292/300; 292/340; 292/DIG. 4; 292/DIG. 15; 292/DIG. 37

(58) Field of Classification Search ........... 292/341.15, 292/341.17, 341.18, 341.19, 340, DIG. 4, 292/DIG. 37, DIG. 60, DIG. 61, DIG. 15, 292/59, 62, 140, 57, 60, 169, 300, 302, 304; 16/82

See application file for complete search history.

(56) References Cited

U.S. PATENT DOCUMENTS

| | | | | |
|---|---|---|---|---|
| 368,595 | A * | 8/1887 | King ........................... 292/332 |
| 2,497,425 | A * | 2/1950 | Terry ........................ 126/285 R |
| 2,839,808 | A * | 6/1958 | Zahodiakin ................. 411/551 |
| 2,922,211 | A * | 1/1960 | Boyd ........................... 411/551 |
| 3,169,293 | A * | 2/1965 | Neuschotz .................... 411/552 |
| 3,178,213 | A * | 4/1965 | Nelson ........................... 292/18 |
| 3,179,457 | A * | 4/1965 | Johnson ........................ 292/195 |
| 4,026,588 | A | 5/1977 | Bisbing et al. |
| 4,207,655 | A * | 6/1980 | MacMaster .................. 411/350 |
| 4,227,726 | A * | 10/1980 | Sorimachi ................ 292/251.5 |
| 4,249,761 | A * | 2/1981 | Nishimura ............... 292/251.5 |
| 4,442,571 | A * | 4/1984 | Davis et al. ................. 411/552 |
| 5,272,894 | A * | 12/1993 | Stillwagon et al. ........... 70/208 |
| 5,275,029 | A * | 1/1994 | Myers ........................... 70/128 |
| 5,882,053 | A * | 3/1999 | Bekins et al. ............. 292/336.3 |
| 6,059,326 | A * | 5/2000 | Tramontina .................. 292/169 |
| 6,669,250 | B1 | 12/2003 | St. Louis |
| 6,782,725 | B1 * | 8/2004 | Linares ......................... 70/360 |

* cited by examiner

*Primary Examiner*—Brian E. Glessner
*Assistant Examiner*—Carlos Lugo
(74) *Attorney, Agent, or Firm*—Stetina Brunda Garred & Brucker

(57) ABSTRACT

A push-to-open latch is selectively moveable between latched and unlatched positions. The push-to-open latch comprises a latch assembly that is reciprocatable relative to a catch assembly. The latch assembly includes a latch housing having a housing bore extending to a housing bottom wall. A pin rod shaft extends upwardly from the housing bottom wall and has a pin rod dowel extending outwardly therefrom. The catch assembly includes a catch housing with an inner and outer cam rotatably disposed therewithin and having mating ends that collectively define a cam interior. The inner and outer cam mating ends have cam bores and inner and outer cam mating end ramps that cooperate to alternately engage and release the pin rod dowel from the cam interior such that the latch is respectively placed in the latched and unlatched positions during reciprocation of the pin rod shaft through the cam bore.

6 Claims, 7 Drawing Sheets

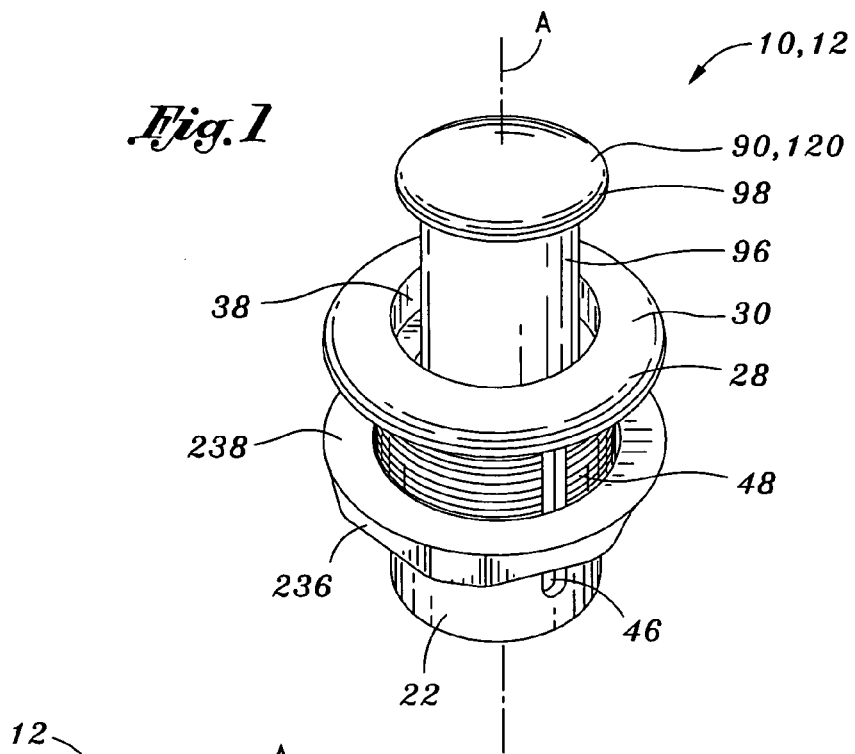
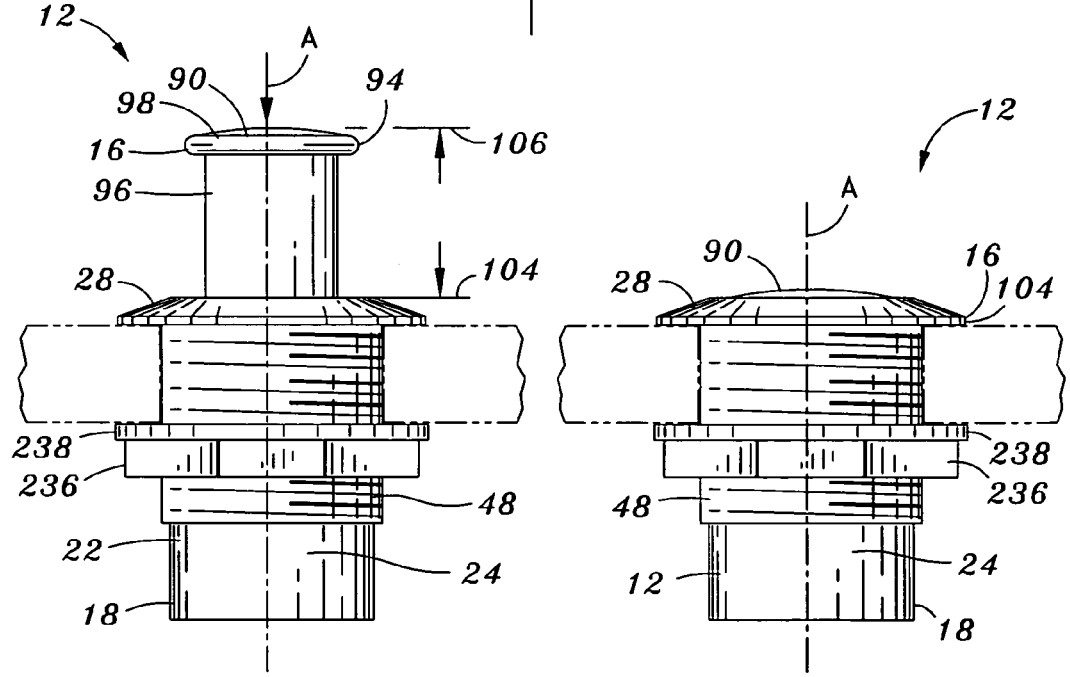
Fig. 1
Fig. 2
Fig. 3

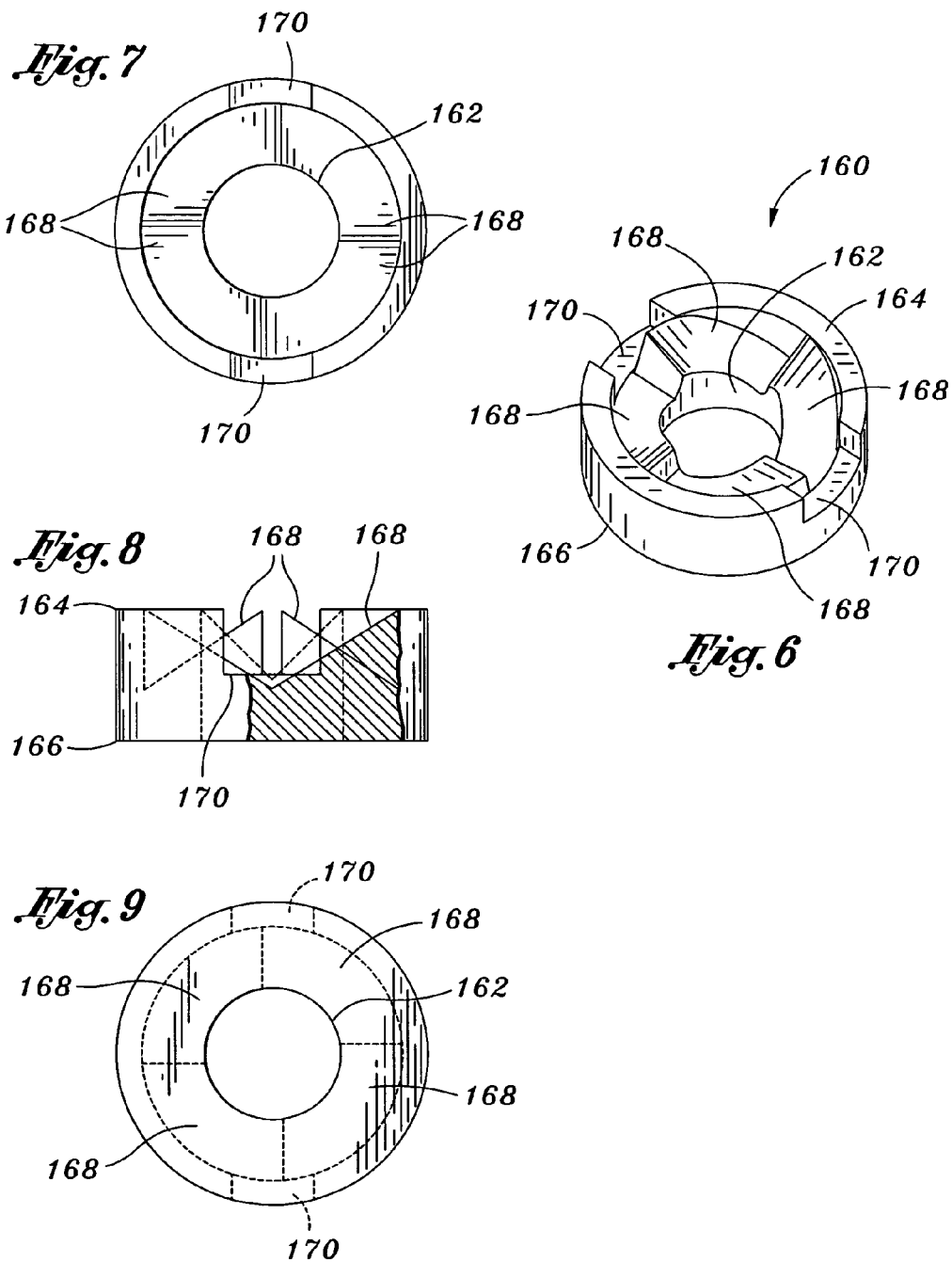

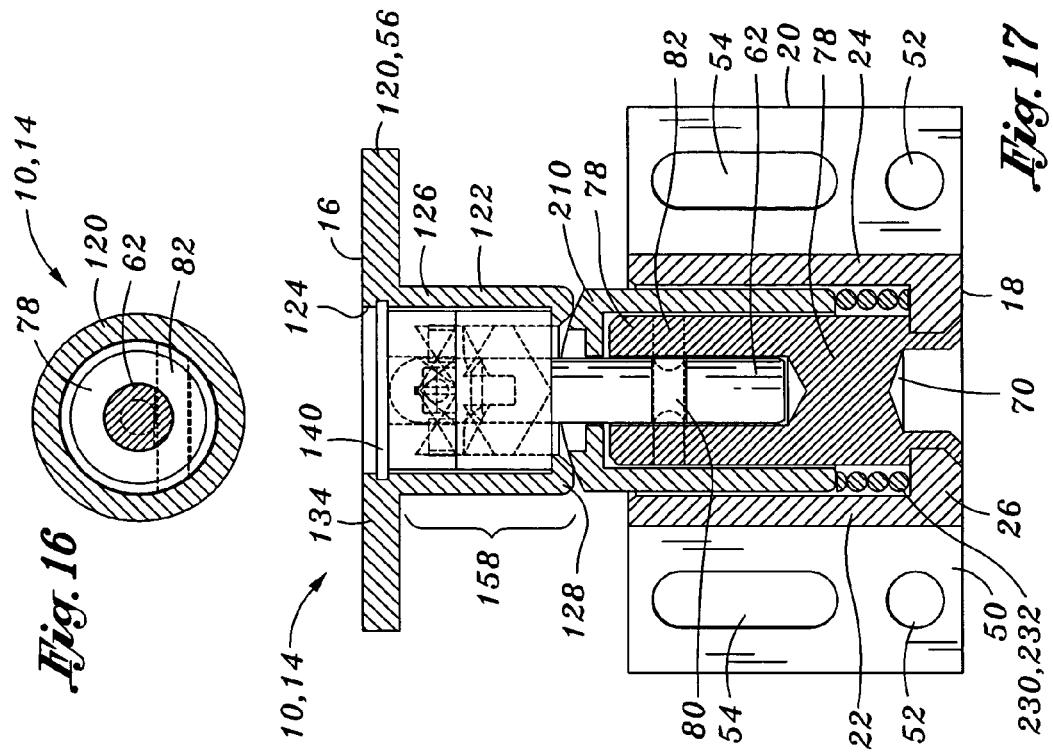
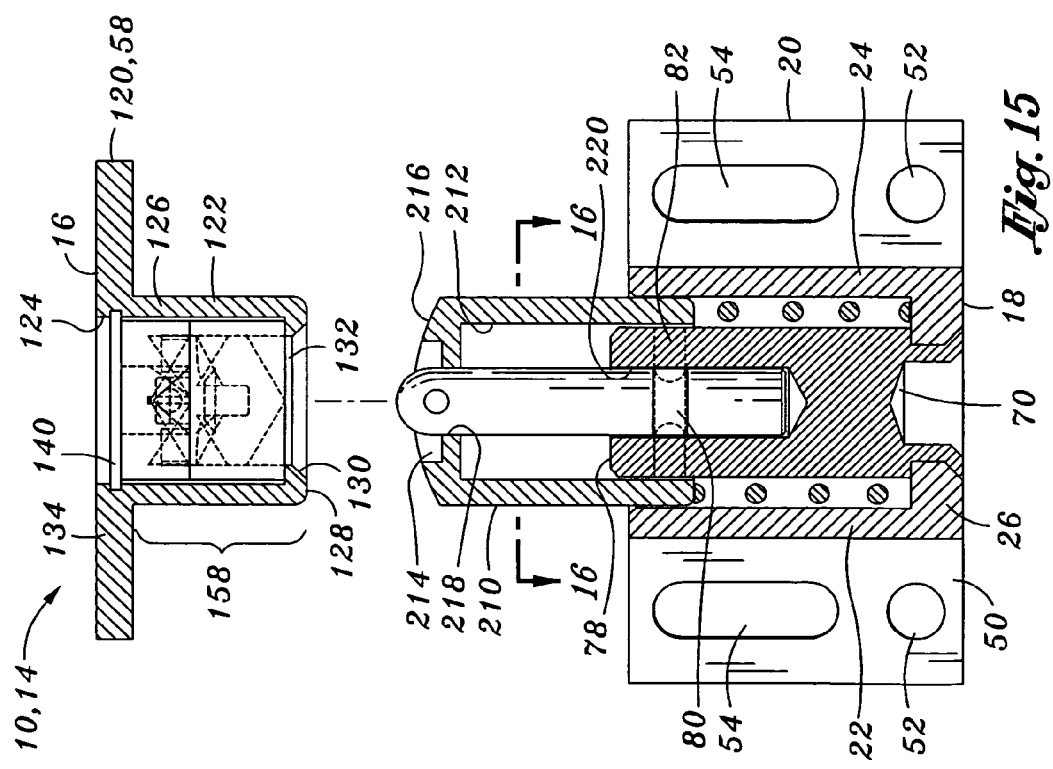

PUSH LATCH

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention relates generally to mechanical latching mechanisms and, more particularly, to a uniquely configured push-to-open latch that may be adapted for use as a hidden door latch or a stowable coat hook which are respectively latchable or stowable in response to an external force applied thereto.

In attempts to improve the appearance of interiors such as aircraft interiors as well as to reduce the hazards posed by protrusions such as cabinet handles in such interiors, several prior art latches have been developed wherein the latch is hidden from view. Such latches may be used in applications wherein a door or drawer is latchable to a cabinet or a bin, etc. Prior art latches have included both mechanical and magnetic means to maintain the door in a closed or latched position.

For example, U.S. Letters Pat. No. 4,026,588 issued to Bisbing et al. discloses a push-to-open magnetic catch for a door of a cabinet. As understood, the magnetic catch of Bisbing includes a housing having a magnet mounted therein. The housing is positioned within the cabinet such that the magnet projects forwardly of the cabinet to contact the cabinet door as it closes as well as to maintain the door in the closed position. The door may be opened by initially pushing inwardly on the door which causes the magnet to separate from the door which, in turn, allows a spring-loaded plunger to push the door outwardly when the inward force is removed.

Although the magnetic catch of the Bisbing reference is configured in such a manner as to avoid misalignment of the magnet during subsequent closing of the door, magnetic catches of the type disclosed in Bisbing suffer from several deficiencies that detract from their overall utility. For example, the magnetic catch as disclosed in Bisbing is comprised of bulky components that occupy a relatively large volume of the cabinet interior which may be more preferably utilized for luggage in consideration of the relatively limited storage space that is available in most aircraft interiors. Furthermore, the magnetic catch of Bisbing as well as magnetic latches in general typically can provide only a finite amount of holding force. Such holding force is particularly important in aircraft applications where the aircraft is susceptible to turbulent flight conditions. Under such conditions, magnetic catches may be incapable of withstanding opening forces acting against an inner surface of a cabinet door due to shifting contents or luggage inside the cabinet.

Mechanical latches have also been developed wherein the latch is hidden from view. For example, U.S. Letters Pat. No. 6,669,250 issued to St. Louis and commercially available from St. Louis Designs, Inc. of Austin, Tex. discloses a latch system that may be mounted within a cabinet. The latch system includes a push-to-open latch mounted to the cabinet interior and a catch that is mounted to a door. The push-to-open latch is comprised of a body having an endless groove formed therein. As understood, one end of the lever has a pin which tracks through the groove and is moveable between two stable positions within the endless groove depending on whether the door is to be placed in a closed position or an open position. An opposite end of the lever has a roller which engages the catch in order selectively to move the lever between the closed and open positions by pushing inwardly on the door to alternately move the pin between the two stable positions within the endless groove.

Although the latch system of the St. Louis reference provides a relatively large holding force as compared to similarly sized magnetic catches of the prior art, the latch system of the St. Louis reference may unfortunately result in asymmetric or eccentric loading on individual components which may limit the operating life of the latch system. For example, as understood, the pin is mounted to the lever and is cantilevered off to one side thereof. Such cantilevered mounting may result in the inducement of excessive bending forces within the lever at the pin attachment point should a user attempt to improperly open the door by pulling outwardly, as is more intuitive, that by pushing inwardly as is required to open the door. Even if outward pulling on the door does not initially damage the latch system, the eccentric loads induced on the lever under repeated attempts to open the door may cause the lever to bend so that, eventually, the pin may jam within the groove.

As can be seen, there exists a need in the art for a push-to-open latch that is mountable within a cabinet so as to be hidden from view and which provides a relatively large holding force against pressure exerted against an interior of the door such as may result from shifting luggage within a compartment of an aircraft interior. In addition, there exists a need in the art for a push-to-open latch that is relatively simple in construction in order to reduce fabrication, installation and maintenance costs. Also, there exists a need in the art for a push-to-open latch that is small in size so as to allow for a greater proportion of useful space in confined interiors. Furthermore, there exists a need in the art for a push-to-open latch that is configured to minimize or eliminate the inducement of eccentric loads on components of the push-to-open latch in order to increase the operating life thereof.

BRIEF SUMMARY OF THE INVENTION

Provided is a push-to-open latch that is adapted for use as a hidden door latch or as a stowable coat hook. Advantageously, the door latch and the coat hook are respectively latchable/unlatchable or stowable/extendable due to the cooperative engagement of a dowel rod assembly with a uniquely configured cam mechanism. In the door latch embodiment, the push-to-open latch is mountable within a cabinet such that no latch hardware is visible on exterior surfaces of the cabinet.

The coat hook embodiment is selectively moveable between stowed and extended positions. In the stowed position, the coat hook is substantially flush with an exterior surface upon which it is mounted so as to eliminate hazardous protrusions. With the door latch or the coat hook embodiment in an unlatched or extended position, pushing inwardly on the push-to-open latch causes the latching of the push-to-open latch or stowing of the coat hook. Subsequently, pushing inwardly on the push-to-open latch causes unlatching of the push-to-open latch or extension of the coat hook.

The push-to-open latch comprises a latch assembly and a catch assembly. In the door latch embodiment, the latch assembly may be mounted to a frame of a cabinet with the catch assembly being mounted on an interior side of a door. In the coat hook embodiment, the latch assembly and catch assembly may be mounted to a mounting surface such as a vertical wall of an aircraft interior compartment.

The push-to-open latch has opposing proximal and distal ends and defines a latch axis along which the latch assembly and catch assembly are reciprocated relative to one another. The latch assembly includes a latch housing with a dowel rod assembly disposed therewithin. The latch housing has a housing bore open at the proximal end. The housing bore has a housing side wall that terminates in a housing bottom wall at the distal end. The dowel rod assembly extends upwardly from the distal end toward the proximal end and includes a pin rod shaft extending upwardly from the housing bottom wall. The pin rod dowel extends laterally outwardly from the pin rod shaft at the proximal end.

The catch assembly is comprised of a catch housing having a catch bore within which an inner cam and an outer cam are rotatably disposed. The inner cam is disposed within the catch bore adjacent to the proximal and with the outer cam being disposed between the inner cam and the dowel rod assembly. Each of the inner and outer cams has a mating end and a bearing end. The mating ends of the inner and outer cams face one another and are placed in generally abutting contact with one another. The bearing end of the inner cam faces toward the proximal end. The bearing end of the outer cam faces toward the distal end.

The inner cam mating end has inner cam mating end ramps formed thereon while the outer cam mating end has outer cam mating end ramps formed thereon. The inner and outer cams are coupled at the mating ends such that the inner and outer cams rotate in unison within the housing bore. The inner and outer cams collectively define a cam interior. The outer cam has a cam bore extending axially therethrough to allow for reciprocation of the pin rod shaft therewithin. The outer cam also includes a cam slot for passage of the pin rod dowel when the catch assembly is reciprocated relative to the latch assembly.

In general, the inner and outer cam mating end ramps cooperate with the dowel rod assembly to alternately engage and release the pin rod dowel from the cam interior such that the push-to-open latch is respectively placed in the latched and unlatched positions during reciprocation of the pin rod shaft through the cam bore along the latch axis. More specifically, the inner and outer cam mating end ramps are configured to effectuate incremental rotation of the inner and outer cams relative to the pin rod dowel when the catch assembly is initially reciprocated within the latch assembly.

Such initial reciprocation occurs by pushing inwardly on the push-to-open latch a first time which causes the pin rod dowel to pass through the cam slot, enter the cam interior and engage the notch in order to place the push-to-open latch in the latched position. Pushing inwardly on the push-to-open latch a second time effectuates further incremental rotation of the pin rod dowel relative to the inner and outer cams. During the second inwardly pushing on the push-to-open latch, rotation of the pin rod dowel relative to the inner and outer cams allows the pin rod dowel to disengage from the notch.

Once disengaged, the pin rod dowel may be withdrawn from the cam interior by exiting through the cam slot in order to place the push-to-open latch in the unlatched position. Importantly, such reciprocative movement is facilitated by a biasing member such as a helical compression spring that biases the catch assembly away from the latch assembly.

BRIEF DESCRIPTION OF THE DRAWINGS

These as well as other features of the present invention will become more apparent upon reference to the drawings wherein:

FIG. 1 is a perspective view of a push-to-open latch of the present invention in a coat hook embodiment;

FIG. 2 is a side view of the coat hook in an extended position;

FIG. 3 is a side view of the coat hook in a stowed position;

FIG. 6 is a perspective view of the outer cam illustrating outer cam mating end ramps formed therewith;

FIG. 7 is a top view of the outer cam;

FIG. 8 is a side view of the outer cam illustrating opposing mating and bearing ends thereof;

FIG. 9 is a bottom view of the outer cam;

FIG. 15 is a side view of the push-to-open latch in a door latch embodiment and illustrating a catch assembly disposed in spaced relation to a latch assembly when the door latch is in an unlatched position;

FIG. 16 is a cross-sectional view of the latch assembly taken along line 16—16 and illustrating a housing sleeve and a pin rod shaft secured to a pin rod support member using an off center pin;

FIG. 17 is a side view of the door latch illustrating the catch assembly connected to the latch assembly when the door latch is in a latched position;

DETAILED DESCRIPTION OF THE INVENTION

Figure 18:
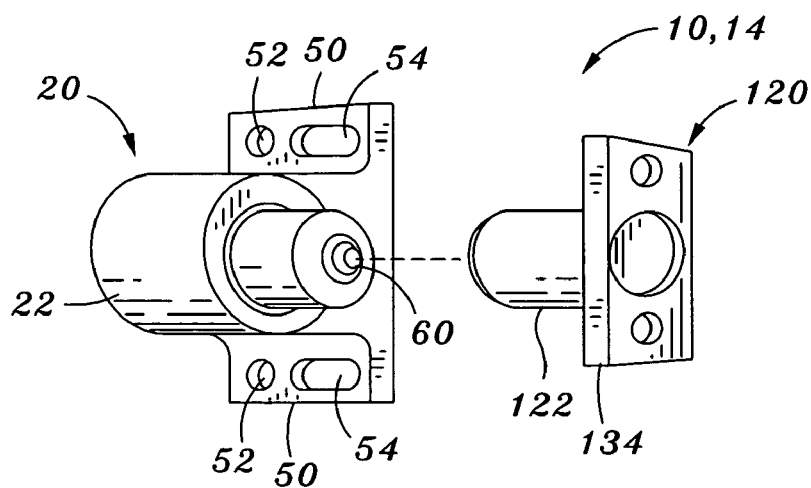
FIG. 18 is a perspective view of the door latch in the unlatched position.
Figure 19:
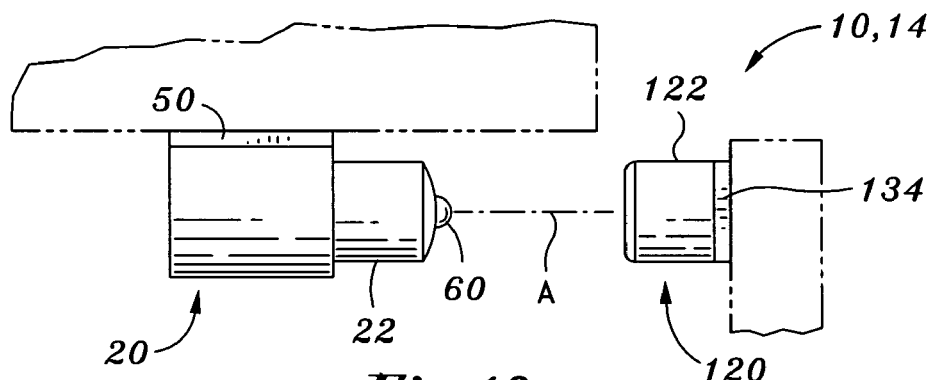
FIG. 19 is a top view of the door latch in the unlatched position.
Figure 20:
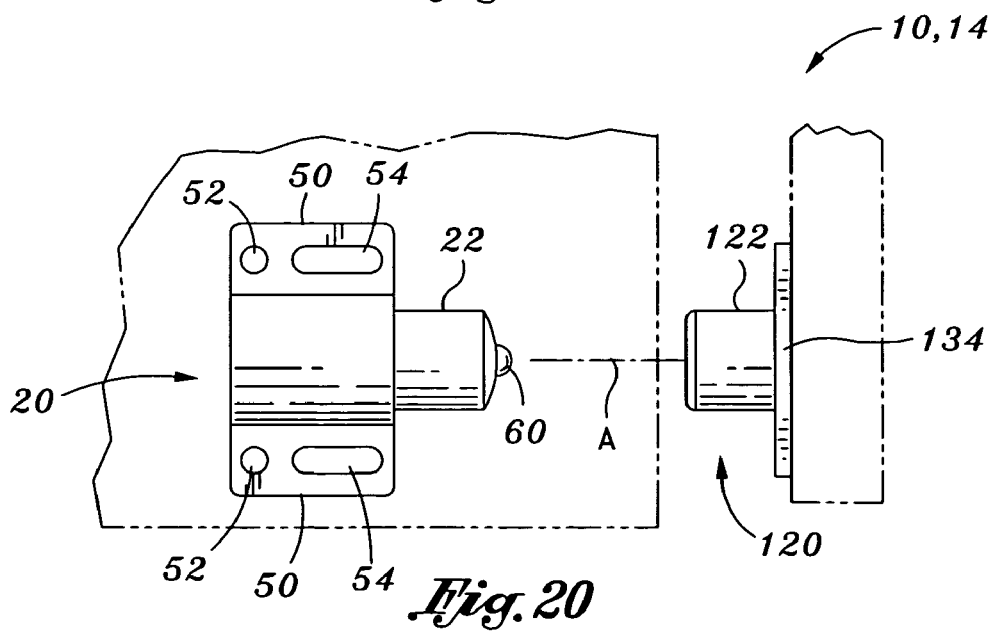
FIG. 20 is a side view of the door latch in the unlatched position.

Referring now to the drawings wherein the showings are for purposes of illustrating the present invention and not for purposes of limiting the same, shown in FIGS. 1–20 is a push-to-open latch 10 that is adapted for use as a hidden door latch 14 (FIGS. 15–20) or a stowable coat hook 12 (FIGS. 1–4) which are respectively latchable/unlatchable or stowable/extendable in response to an external force applied thereto due to the cooperative engagement of a dowel rod assembly 60 with a uniquely configured cam mechanism 158. In the door latch 14 embodiment, the push-to-open latch 10 is mountable within a cabinet such that no latch hardware is visible on exterior surfaces of the cabinet, as shown in FIGS. 19 and 20. In the coat hook 12 embodiment, the push-to-open latch 10 is selectively moveable between stowed and extended positions 104, 106 as shown in FIGS. 2–3.

Figure 5:
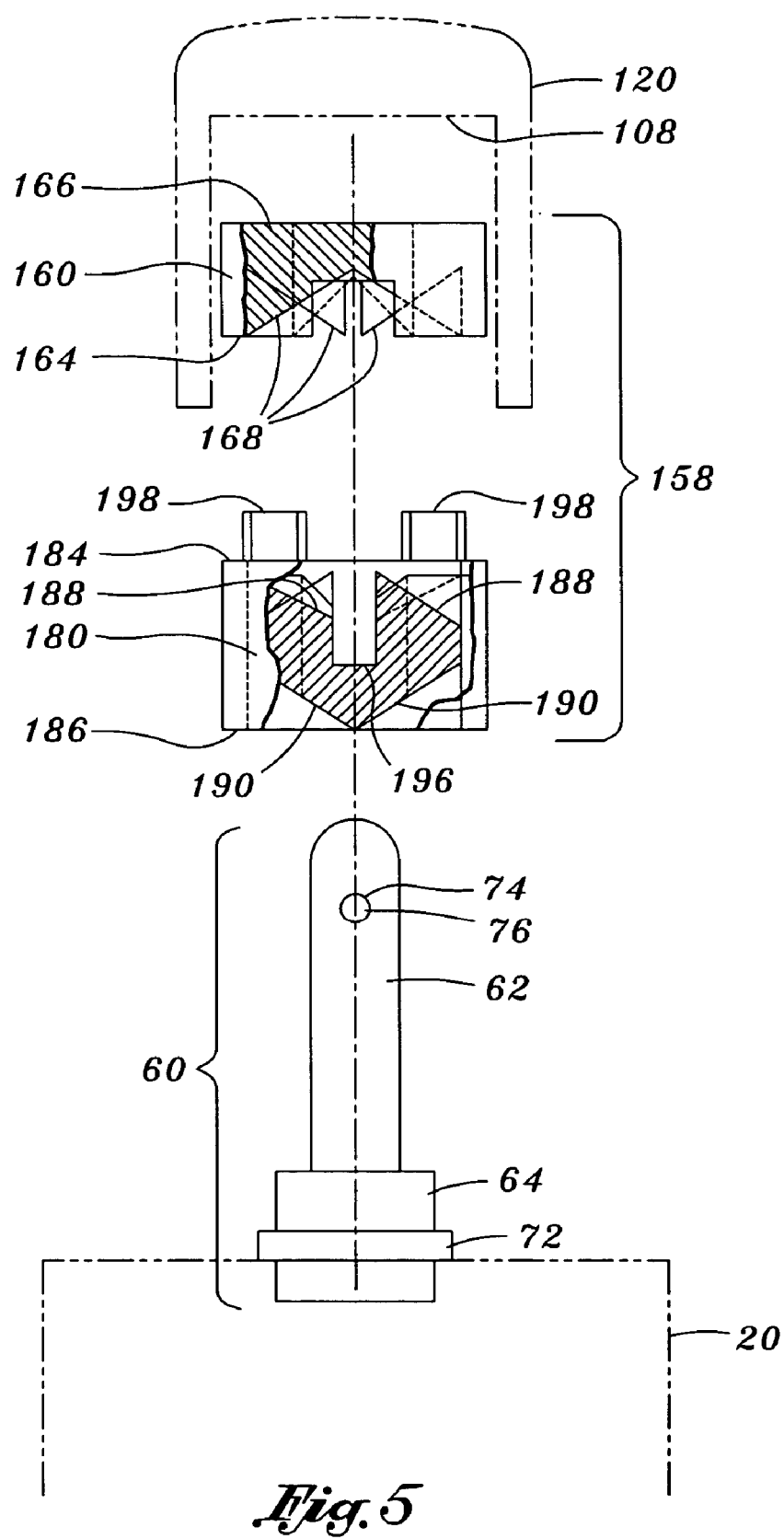
FIG. 5 is a partial exploded view of the dowel rod assembly and an inner and outer cam that make up the cam mechanism.
Figure 12:
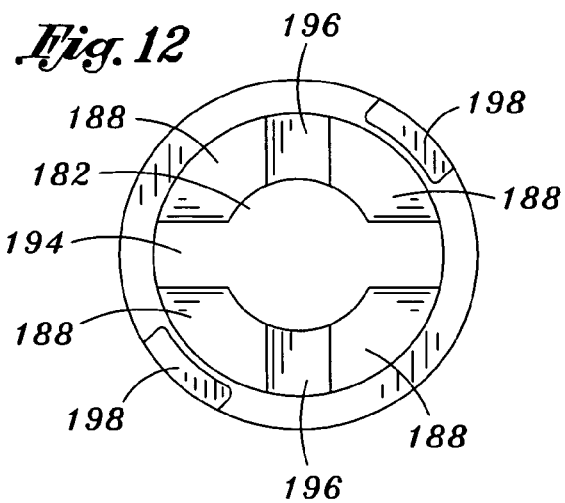
FIG. 12 is a top view of the inner cam illustrating a cam notch formed with the inner cam mating end ramps.
Figure 10:
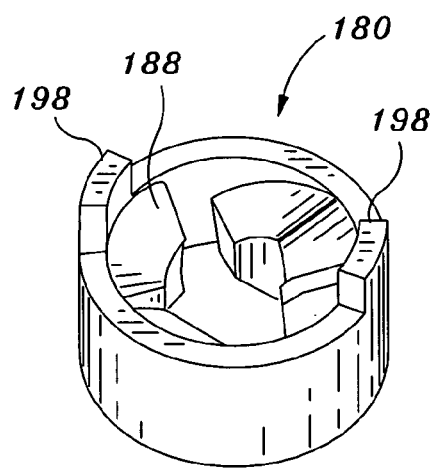
FIG. 10 is a perspective view of the inner cam illustrating inner cam mating end ramps formed therewith.
Figure 13:
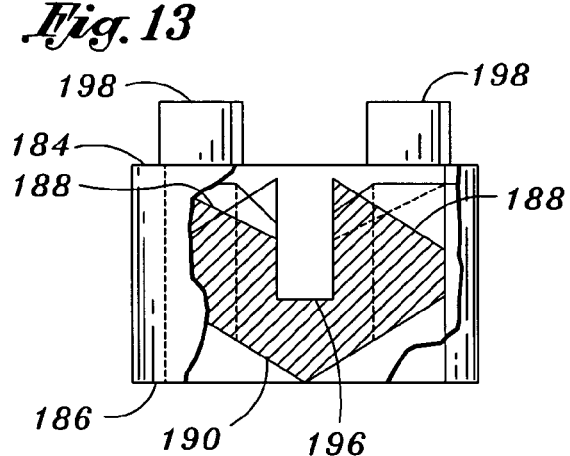
FIG. 13 is a side view of the inner cam illustrating opposing mating and bearing ends thereof.
Figure 11:
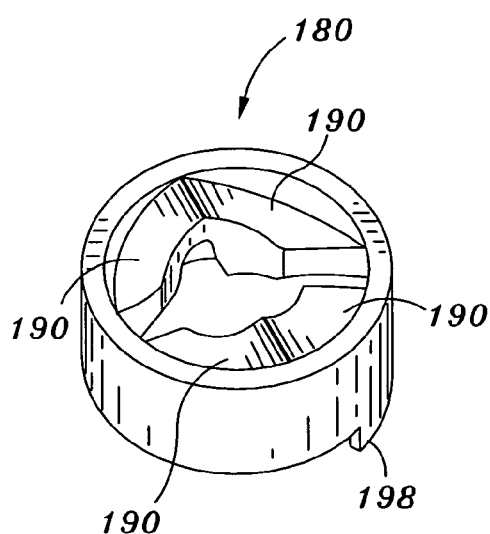
FIG. 11 is a perspective view of the inner cam illustrating inner cam bearing end ramps formed therewith.
Figure 14:
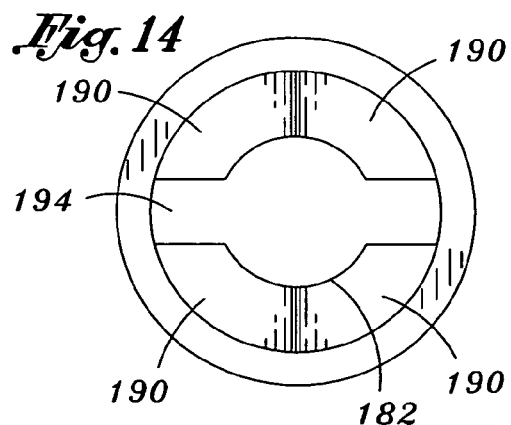
FIG. 14 is a bottom view of the inner cam illustrating a cam slot formed therethrough.

As best seen in FIG. 3, in the stowed position 104, the coat hook 12 may be configured to be substantially flush with an exterior surface upon which it is mounted so as to eliminate any protrusions that may present a hazard to persons or property. With the door latch 14 or the coat hook 12 embodiments in an unlatched or extended position 106, pushing inwardly on the push-to-open latch 10 a first time causes the latching of the push-to-open latch 10. Pushing inwardly on the push-to-open latch 10 a second time causes unlatching of the push-to-open latch 10. Due to the unique arrangement and cooperation of the cam mechanism 158 with the dowel rod assembly 60 as shown in FIG. 5, the push-to-open latch 10 may be alternately latched and unlatched by simply pushing inwardly thereon.

Figure 4:
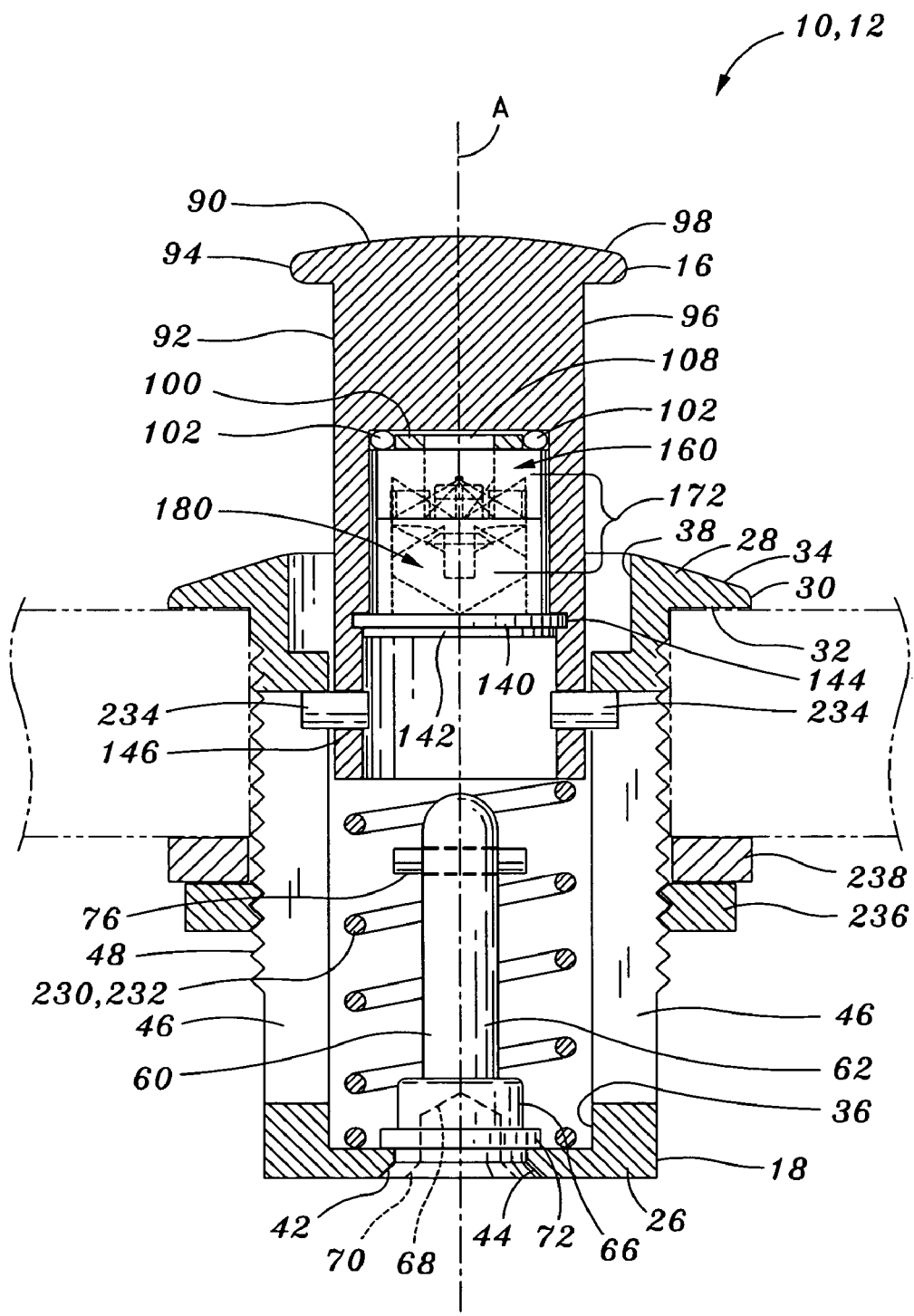
FIG. 4 is cross-sectional view of the coat hook illustrating the interconnectivity of a dowel rod assembly and a cam mechanism.

In its broadest sense, the push-to-open latch 10 comprises a latch assembly 20 and a catch assembly 120. In the door latch 14 embodiment, the latch assembly 20 may be mounted to a frame of a cabinet or a bin with the catch assembly 120 being mounted on an interior side of a door of the cabinet or bin, as is illustrated in FIGS. 18–20. In the coat hook 12 embodiment, the latch assembly 20 and catch assembly 120 are coupleable such that this single unit may be mounted to a mounting surface such as a walled structure as shown in FIGS. 2–4. Such walled structure may include a vertical wall of an aircraft interior compartment although the coat hook 12 may be mounted to any mounting surface of any structure.

Although both embodiments share a commonality in their structural arrangement as well as in their functional attributes, particularly with regard to the cam mechanism 158, the door latch 14 differs from the coat hook 12 regarding the interconnectivity of the catch assembly 120 relative to the latch assembly 20. More specifically, the catch assembly 120 is continuously coupled to the latch assembly 20 during operation of the coat hook 12 embodiment. Conversely, the catch assembly 120 is completely decouplable from the latch assembly 20 during operation of the door latch 14 embodiment, as will be described in greater detail below.

Furthermore, the door latch 14 embodiment includes several additional components not included with the coat hook 12 embodiment. For example, as shown in FIGS. 15 and 17, the door latch 14 includes provisions for separate mounting of the catch assembly 120 and latch assembly 20. In addition, the door latch 14 includes a housing sleeve 210 which is axially slidable over a pin rod support member 78. The dowel rod assembly 60 is slidable through a sleeve aperture formed in the housing sleeve. The pin rod support member 78 and the housing sleeve 210 are configured to minimize hazards otherwise posed by the dowel rod assembly 60 protruding outwardly from a hemi-spherical surface 216 when the latch assembly 20 is completely decoupled from the catch assembly 120, as will be described in greater detail. Due to the difference in configurations, the structural arrangement of the push-to-open latch 10 will be first described with reference to the coat hook 12 embodiment shown in FIGS. 1–14, followed by a description of the structural arrangement of the door latch 14 embodiment shown in FIGS. 5–20. A description of the operation of both embodiments of the push-to-open latch 10 will then be provided.

Referring to FIGS. 1–14, shown is the push-to-open latch 10 and basic components thereof. As can be seen, the push-to-open latch 10 generally has opposing proximal and distal ends 16, 18 and defines a latch axis A along which the latch assembly 20 and catch assembly 120 are reciprocatively moved relative to one another. The latch assembly 20 includes an elongate latch housing 22 with a generally elongate dowel rod assembly 60 disposed therewithin. The latch housing 22 has a housing bore 36 which is open at the proximal end 16.

As can be seen in FIG. 4, the housing bore 36 defines a housing side wall 24 that extends along the latch axis A and which terminates in a housing bottom wall 26 at the distal end 18. Although shown as being generally cylindrically shaped in the coat hook 12 and door latch 14 embodiments, the, latch housing 22 may be configured in a variety of alternative shapes and sizes. Likewise, the housing bore 36 may be configured in a variety of shapes other than the cylindrical shape shown. Furthermore, although shown as being concentrically formed within the latch housing 22, the housing bore 36 may be positioned in any suitable location within the latch housing 22.

Regarding the specific configuration of the push-to-open latch 10 in the coat hook 12 embodiment, the latch housing 22 includes an annular housing shoulder 30 extending-radially outwardly from a housing side wall 24 adjacent to the proximal end 16. To facilitate mounting of the latch housing 22 into an opening included on a mounting surface (not shown) such as a wall surface, a housing shoulder inner surface 32 and a threaded portion 48 are included with the latch housing 22.

The threaded portion 48 is formed over a portion of the housing side wall 24 and extends from the housing shoulder inner surface 32 toward the distal end 18. The latch housing 22 may be inserted into the hole provided in the mounting surface and may be secured thereto by threadably engaging a hex jam nut 236 onto the threaded portion 48 to capture the wall surface between the housing shoulder inner surface 32 and the hex jam nut 236. A housing washer 238 may be provided under the hex jam nut 236 to facilitate tightening of the hex jam nut 236.

Referring still to FIGS. 1–4, opposite the housing shoulder inner surface 32 is a housing shoulder outer surface 34 which may be generally beveled to enhance the aesthetics of the coat hook 12 when installed on the wall surface. A housing counterbore 38 may be concentrically formed within the housing shoulder 30 to receive the catch assembly 120 which, in the embodiment of the coat hook 12, is configured as a button assembly 90 as shown in FIG. 4 and as will be described in greater detail below. The housing counterbore 38 is preferably larger in diameter than the housing bore 36 and is preferably sized and configured to receive the button assembly 90 thereinto when the coat hook 12 is placed in a stowed position 104. In addition, the housing counterbore 38 is preferably provided at a depth sufficient to allow the button assembly 90 to nest therewithin in a substantially flush relationship with the housing shoulder outer surface 34.

Referring still to FIG. 4, the dowel rod assembly 60 extends upwardly from the distal end 18 toward the proximal end 16 in alignment with the latch axis A. More specifically, the dowel rod assembly 60 includes a pin rod shaft 62 extending upwardly from the housing bottom wall 26. Although the dowel rod assembly 60 may be integrally formed within the housing assembly, in the embodiments shown, the housing bottom wall 26 includes a pin rod mounting hole 42 formed therein for mounting the pin rod hole as a separate component. If separately formed, the pin rod shaft 62 may be configured as shown in FIG. 4 wherein a cylindrical pin boss 64 may be formed at the distal end 18.

A pin shoulder 66 forms a transition between the pin rod shaft 62 wherein the pin boss 64 is formed at a slightly larger diameter than that of the pin rod shaft 62.

An annular rib 72 may be formed on the pin boss 64 extending about an outer circumferential surface thereof. The rib 72 provides a surface against which the housing bottom wall 26 may bear when the pin rod shaft 62 is mounted in the latch housing 22. A mounting hole countersink 44 may be included on an exterior side of the housing bottom wall 26. The pin boss 64 may include a pin rod counterbore 68 with a pin rod countersink 70 formed at the distal end 18 such that the pin rod shaft 62 may be secured to the housing bottom wall 26 by mechanically forming or splaying out an end of the pin boss 64 in a manner similar to the setting or forming of a conventional rivet. By splaying out the end of the pin boss 64, the housing bottom wall 26 is firmly captured between the splayed end and the pin shoulder 66 to rigidly secure the pin rod shaft 62 to the latch housing 22. Using such a means of attachment, the pin rod shaft 62 is non-rotatably fixed to the latch housing 22 as is preferable for the coat hook 12 embodiment. However, in the door latch 14 embodiment, the pin rod shaft 62 is preferably axially fixed but freely rotatable, as will be described in greater detail below.

Referring still to FIG. 4, the pin rod dowel 76 extends laterally outwardly from the pin rod shaft 62 at the proximal end 16 and is preferably diametrically extended through a pin dowel hole 74 formed in the pin rod shaft 62 at the proximal end 16 thereof. The pin rod dowel 76 is preferably extended past opposing sides of the pin rod shaft 62 in equal lengths. In addition, the pin rod dowel 76 is preferably oriented generally perpendicularly to the latch axis A. Alternatively, the pin rod dowel 76 may be integrally formed with the pin rod shaft 62 such as by machining the dowel rod assembly 60 as a unitary structure. As shown in FIG. 4, the proximal end 16 of the pin rod shaft 62 may be spherically formed to facilitate insertion into the catch assembly 120. However, the proximal end 16 of the pin rod shaft 62 may simply be squared off or formed at an orientation that is normal or perpendicular to the latch axis A. A chamfer may be formed about a perimeter corner of the pin rod shaft 62 in order to facilitate insertion thereof into the cam mechanism 158, as shown in FIG. 5.

The catch assembly 120 is reciprocatively moveable relative to the latch assembly 20 along the latch axis A. As was earlier mentioned, the catch assembly 120 of the coat hook 12 embodiment is configured to be generally continuously coupled to the latch assembly 20 in the sense that the catch assembly 120 is slidably contained within the housing bore 36 whether or not the coat hook 12 is in the stowed position 104 or the extended position 106. In contrast, the catch assembly 120 of the door latch 14 embodiment is configured to be completely decoupled from the latch assembly 20 when in the unlatched position 58.

As shown in FIG. 4, the catch assembly 120 is comprised of a generally elongate catch housing 122 having an elongate catch bore 124 within which an inner cam 160 and an outer cam 180 are rotatably disposed. The catch housing 122 has a catch side wall 126 which may be generally cylindrically shaped although numerous other shapes may be suitably used. The inner cam 160 is generally disposed within the catch bore 124 adjacent to the proximal with the outer cam 180 being axially aligned therewith and disposed between the inner cam 160 and the dowel rod assembly 60. Each of the inner and outer cams 160, 180 has a mating end 164, 184 and a bearing end 166, 186. The mating ends 164, 184 of the inner and outer cams 160, 180 are oriented to face one another and may be placed in generally abutting contact with one another when installed in the catch housing 122. The bearing end 166 of the inner cam 160 is oriented to face toward the proximal end 16. The bearing end 186 of the outer cam 180 is oriented to face toward the distal end 18.

Referring now to FIGS. 6–14, the inner cam 160 mating end 164 has inner cam mating end ramps 170 formed thereon while the outer cam 180 mating end 184 has outer cam mating end ramps 188 formed thereon. When installed in the catch bore 124 and placed in general abutting contact at respective ones of the mating ends 164, 184, the inner and outer cams 160, 180 collectively define a cam interior 172, as best seen in FIG. 4. The outer cam 180 has a cam bore 162 extending axially therethrough to allow for reciprocation of the pin rod shaft 62 therewithin. The inner cam 160 may also have a cam bore 162 formed therethrough to allow an extreme end of the pin rod shaft 62 to reciprocate thereinto. In general, the inner and outer cam mating end ramps 168, 188 cooperate to alternately engage and release the pin rod dowel 76 from the cam interior 172 such that the push-to-open latch 10 is respectively placed in the latched and unlatched positions 56, 58 during reciprocation of the pin rod shaft 62 through the cam bore 162 along the latch axis A, as will be described in greater detail below Referring still to FIGS. 6–14, the inner and outer cams 160, 180 are coupled at respective ones of the mating ends 164, 184 such that the inner and outer cams 160, 180 rotate in unison within the catch bore 124. To facilitate such unitary rotational movement, the inner cam 160 mating end 164 may include a pair of diametrically opposed receiving apertures 170 formed in a perimeter wall of the inner cam 160. Such receiving apertures 170 may be configured to extend axially outwardly from the perimeter wall of the mating end 164 of the inner cam 160. A corresponding pair of projections 198 may be formed on the mating end 184 of the outer cam 180. Such projections 198 may be diametrically opposed and positioned relative to the receiving apertures 170 of the inner cam 160 such that the inner and outer cam mating end ramps 168, 188 are placed in proper registration with one another for latching and unlatching of the push-to-open latch 10.

In addition, the projections 198 are preferably sized and configured to be complementary to the pair of receiving apertures 170 for coupling the inner and outer cams 160, 180 to prevent relative rotational movement therebetween. In this manner, the inner and outer cams 160, 180 may rotate in unison when placed in generally abutting contact with one another at their mating ends 164, 184. Although the projections 198 and receiving apertures 170 are shown as being generally square-shaped, it is recognized herein that there are an infinite variety of configurations for the projections 198 and receiving apertures 170 that may be incorporated into the inner and outer cams 160, 180 for non-rotatable coupling thereof.

The outer cam 180 may further include a cam slot 194 extending axially therethrough for passage of the pin rod dowel 76 when the catch assembly 120 is reciprocated relative to the latch assembly 20. The outer cam mating end ramps 188 may also include a notch 196 formed thereon for engaging the pin rod dowel 76. The cam slot 194 and notch 196 are preferably sized to accommodate (i.e., allow passage of) the pin rod dowel 76 when the pin rod shaft 62 is inserted through the cam bore 162. In this regard, the cam slot 194 and notch 196 are each preferably diametrically oriented within the outer cam 180 and are of a length and width that accommodates a length and width of the pin rod dowel 76. The cam slot 194 may be oriented at an angular spacing of about forty-five degrees to the orientation of the projections 198 and receiving apertures 170 although it is contemplated that the cam slot 194 may be oriented at any position relative to the projections 198 and receiving apertures 170.

Importantly, the inner and outer cam mating end ramps 168, 188 are configured to effectuate incremental rotation of the inner and outer cams 160, 180 relative to the pin rod dowel 76 when the catch assembly 120 is initially reciprocated within the latch assembly 20. Such initial reciprocation occurs by pushing inwardly on the push-to-open latch 10 a first time which causes the pin rod dowel 76 to pass through the cam slot 194, enter the cam interior 172 and engage the notch 196 in order to place the push-to-open latch 10 in the latched position 56.

Pushing inwardly on the push-to-open latch 10 a second time causes unlatching of the push-to-open latch 10 due to the configuration of the inner and outer cam mating end ramps 168, 188. More specifically, the inner and outer cam mating end ramps 168, 188 are configured to effectuate further incremental rotation of the pin rod dowel 76 relative to the inner and outer cams 160, 180 when the catch assembly 120 is reciprocated for a second time within the latch assembly 20. During the second inward pushing on the push-to-open latch 10, rotation of the pin rod dowel 76 relative to the inner and outer cams 160, 180 allows the pin rod dowel 76 to disengage from the notch 196. Once disengaged, the pin rod dowel 76 may be withdrawn from the cam interior 172 by exiting through the cam slot 194 in order to place the push-to-open latch 10 in the unlatched position 58.

Such reciprocative movement is facilitated by a biasing member 230 such as a helical compression spring 232 that is disposed within the latch assembly 20. Importantly, the biasing member 230 is configured to apply a biasing force to bias the catch assembly 120 away from the latch assembly 20. Where the push-to-open latch 10 is configured in the coat hook 12 embodiment, the biasing member 230 or compression spring 232 forces the button assembly 90 (i.e., the structural equivalent of the catch assembly 120) outwardly toward the proximal end 16. Where the push-to-open latch 10 is configured in the door latch 14 embodiment, the compression spring 232 forces the pin rod dowel 76 into alignment with the cam slot 194. In addition, in the door latch 14 embodiment, the compression spring 232 also acts to fling or push the door away from the cabinet such that the door may then be grasped by the user and opened further.

In each of the embodiments shown and described (i.e., the coat hook 12 and the door latch 14) as well as other potential embodiments that may incorporate the cam mechanism 158 in cooperation with the pin rod dowel 76, each reciprocative cycle or movement is comprised of an inward stroke and an outward stroke. For example, should a user desire access to an interior of the cabinet, the inward stroke may be provided by the user pushing inwardly to apply a compression force on the door of the cabinet.

The outward stroke may be applied by the compression spring 232 once the user releases the compression force to complete the reciprocative cycle and unlatch the door. A subsequent reciprocative cycle comprises an additional inward stroke, applied by the user, followed by an outward stroke, applied by the compression spring 232, causing latching of the door. A similar set of reciprocative cycles would be provided to the coat hook 12 to alternately place the coat hook 12 in the stowed and extended positions 104, 106.

Initial alignment of the pin rod dowel 76 with the cam slot 194 is facilitated by outer cam bearing end ramps 190 formed on the bearing end 186 of the outer cam 180. Regardless of the initial angular positions of the pin rod dowel 76 relative to the slot, the outer cam bearing end ramps 190 are configured to rotate the outer cam 180 about the latch axis A until the cam slot 194 is aligned with the pin rod dowel 76 upon advancement of the pin rod shaft 62 into the cam bore 162 such that the pin rod dowel 76 may enter the cam interior 172. As shown in FIGS. 10–14, the outer cam bearing end ramps 190 may be comprised of a set of sloping surfaces 192 formed on the bearing end 186 and sloping away from one another in opposed radial directions. Each sloping surface 192 of the pair may preferably be formed at an angle in the range of from about twenty degrees to about fifty degrees relative to the latch axis A although the sloping surfaces 192 may be formed at any angle that allows for alignment of the cam slot 194 with the pin rod dowel 76.

The sloping surfaces 192 of the outer cam bearing end ramps 190 preferably form an apex extending along a diameter of the bearing end of the outer cam 180. The sloping surfaces 192 of the outer cam bearing end ramps 190 are also preferably oriented at an approximate ninety-degree angle to the cam slot 194 which extends completely axially through the outer cam 180. Each sloping surface 192 defines a generally planar surface. It should be noted that the particular configuration of the outer cam bearing end ramps 190 are exemplary in nature and may be alternatively configured in any shape, size or orientation or slope angle suitable to cause alignment of the pin rod dowel 76 with the cam slot 194 during relative rotational movement between the pin rod dowel 76 and the inner and outer cams 160, 180.

Referring now to the configuration of the cam interior 172 and more specifically, the configurations of the inner, and outer cam mating ends 164, 184, the inner and outer cam mating end ramps 188 are configured to effectuate an approximately ninety degree rotation of the inner and outer cams 160, 180 relative to the pin rod dowel 76 during an initial reciprocative cycle (i.e., an inward stroke followed by an outward stroke). As was earlier mentioned, the reciprocative cycle comprises movement of the catch assembly 120 relative to the latch assembly 20 when a compression force is applied to the catch assembly 120.

The compression force may be manually applied such as by a user desiring to extend the button assembly 90 of the coat hook 12 embodiment such that the user may hang a coat thereon. Alternatively, the compression force may be applied by the user in order to open the door of a storage bin. The compression force must be large enough to overcome the biasing force such that the pin rod dowel 76 passes through the cam slot 194, enters the cam interior 172, moves toward and engages the inner cam mating end ramps 170 causing rotation of the inner and outer cams 160, 180 relative to the pin rod dowel 76. Release of the compression force allows the biasing force to cause the pin rod dowel 76 to reverse direction and move toward and engage the outer cam mating end ramps 188 causing further rotation of the inner and outer cams 160, 180 until the pin rod dowel 76 engages the notch 196 in order to place the push-to-open latch 10 in the latched position 56.

During a second reciprocative cycle, the inner and outer cam mating end ramps 168, 188, are configured to effectuate a further approximately ninety degree rotation of the pin rod dowel 76 relative to the inner and outer cams 160, 180. In the second reciprocative cycle, the compression force is applied to the catch assembly 120 to cause further reciprocation thereof relative to the latch assembly 20 such that the pin rod dowel 76 becomes disengaged from the notch 196, moves toward and engages the inner cam 160 mating end ramp 170 and causing rotation of the inner and outer cams 160, 180 relative to the pin rod dowel 76. Release of the compression force allows the biasing force to cause the pin rod dowel 76 to reverse direction and move toward and engage the outer cam mating end ramps 188 causing further rotation of the inner and outer cams 160, 180 until the pin rod dowel 76 is aligned with the cam slot 194. Once aligned with the slot, the biasing force withdraws the pin rod dowel 76 from the cam interior 172 through the cam slot 194 in order to place the push-to-open latch 10 in the unlatched position 58.

The rotation of the inner and outer cams 160, 180 relative to the pin rod dowel 76 is facilitated by configuring the inner cam mating end ramps 170 as a set of four separate sloping surfaces 192 that are preferably, but optionally, equi-angularly spaced about the cam bore 162. The sloping surfaces 192 are also preferably oriented to slope in a generally uniform direction. For example, the sloping surfaces 192 may be oriented to slope in a helical orientation or in a generally circumferential or radial orientation. The outer cam mating end ramps 188 may likewise be similarly configured as a set of four separate sloping surfaces 192. When configured as described above, a detent is formed between each of the sloping surfaces 192. Diametrically opposed detents then cooperate to temporarily halt the rotational movement of the pin rod dowel 76 during each of the inward and outward strokes of the reciprocative cycles.

When configured in this manner, the sloping surfaces 192 of the inner and outer cam mating end ramps 168, 188 are configured to cause an approximate forty-five degree rotation of the pin rod dowel 76 relative to the inner and outer cams 160, 180 for each inward stroke as well as for each outward stroke for a total rotation of about ninety degrees. In order to effectuate the approximate ninety degrees of rotation occurring during each reciprocative cycle, the set of sloping surfaces 192 of the inner cam mating end ramps 170 are preferably angularly juxtapositioned or offset from the set of sloping surfaces 192 of the outer cam mating end ramps 188 by about forty-five degrees. Correspondingly, the cam slot 194 and notch 196 are preferably angularly offset by about ninety degrees from one another such that the push-to-open latch 10 may be positively latched and unlatched.

The coat hook 12 embodiment will now be described with occasional reference to the above mentioned descriptions of the catch assembly 120 and latch assembly 20. The coat hook 12 is selectively moveable between stowed and extended positions 104, 106 and has opposing proximal and distal ends 16, 18 with the latch axis A extending therebetween. The latch assembly 20 of the coat hook 12 embodiment is configured similar to the latch assembly 20 of the push-to-open latch 10. FIG. 4 shows a button assembly 90 of the coat hook 12 embodiment which is the structural equivalent of the catch assembly 120 for the push-to-open latch 10. The button assembly 90 incorporates the inner and outer cams 160, 180 in the same manner as was earlier described for the catch assembly 120.

The button assembly 90 is axially non-rotatably reciprocatable within the housing bore 36, as shown in FIG. 4. The button assembly 90 is configured to extend partially out of the latch assembly 20 at the proximal end 16 when the coat hook 12 is in the extended position 106 and is generally flush with the latch assembly 20 when the coat hook 12 is in the stowed position 104. The button assembly 90 includes an elongate button housing 92 within which the inner and outer cams 160, 180 are rotatably disposed. The button housing 92 is generally cylindrically shaped and having a cylindrical button bore 148 open on one end and defining a button side wall 96. The button side wall 96 extends to a button bottom surface 108 on an opposing end of the button housing 92.

As was earlier described, the inner cam 160 is generally shaped so as to be freely axially rotatable about the latch axis A within the button bore 148. More specifically, the inner cam 160 is preferably cylindrically shaped and sized complementary to the button bore 148 and has the bearing end 166 disposed against the button bottom surface 108. The mating end 164 includes the pair of diametrically opposed receiving apertures 170 formed in the perimeter wall of the inner cam 160. The inner cam 160 further includes the set of four inner cam mating end ramps 170 preferably equi-angularly spaced about the cam bore 162 and sloping in a generally circumferential direction, as was also earlier described.

The outer cam 180 is likewise generally cylindrically shaped within the button bore 148 and is sized complementary thereto. The mating end 184 of the outer cam 180 includes the pair of diametrically opposed projections 198 configured to be complementary to the pair of receiving apertures 170 to prevent relative rotational movement between the inner and outer cams 160, 180.

The inner and outer cam 160, 180 mating ends 164, 184 collectively define the cam interior 172. The outer cam 180 has the cam bore 162 and the diametrically oriented cam slot 194 as well as the set of outer cam bearing end ramps 190 to align the pin rod dowel 76 with the slot during initial reciprocation of the dowel rod assembly 60 with the cam mechanism 158. The set of four outer cam mating end ramps 188 are preferably equi-angularly spaced about the cam bore 162 and are oriented to slope in the generally helical or circumferential direction. The outer cam mating end ramps 188 further include the notch 196 oriented generally perpendicularly to the cam slot 194.

Interposed between the housing bottom wall 26 and the outer cam 180 bearing end 186 is the compression spring 232 which is coaxially disposed about the pin rod shaft 62. As was earlier mentioned, the compression spring 232 is configured to apply the biasing force to bias the button assembly 90 away from the latch assembly 20 during each reciprocative cycle. Operating in the same manner as was described above for the push-to-open latch 10, the outer cam bearing end ramps 190 are configured to rotate the inner and outer cams 160, 180 about the latch axis A until the cam slot 194 is aligned with the pin rod dowel 76 upon advancement of the pin rod shaft 62 into the cam bore 162 such that the pin rod dowel 76 may enter the cam interior 172.

The inner and outer cam 160, 180 mating end ramps 168, 188 are configured to effectuate an approximately ninety degree rotation of the inner and outer cams 160, 180 relative to the pin rod dowel 76 when the compression force is applied (i.e., by the user) to the button assembly 90 to overcome the biasing force. During such initial reciprocation of the button assembly 90 within the latch assembly 20, the pin rod dowel 76 passes through the cam slot 194, enters the cam interior 172, moves toward and engages the inner cam mating end ramps 170 causing rotation of the inner and outer cams 160, 180. Release of the compression force (i.e., by the user) allows the biasing force to cause the pin rod dowel 76 to reverse direction and move toward and engage the outer cam mating end ramps 188. Such reversal of movement of the pin rod dowel 76 causes further rotation of the inner and outer cams 160, 180 when the pin rod dowel 76 bears against the outer cam mating end ramps 188. The rotation continues until the pin rod dowel 76 engages the notch 196 such that the coat hook 12 is placed in the stowed position 104.

The inner and outer cam mating end ramps 188 are also configured to effectuate a further approximately ninety degree incremental rotation of the pin rod dowel 76 relative to the inner and outer cams 160, 180. During application of the compression force (i.e., by the user) to the button assembly 90, the pin rod dowel 76 becomes disengaged from the notch 196 and moves toward and engages the inner cam mating end ramps 170. The sloping surface 192 of the inner cam mating end ramps 170 causes rotation of the inner and outer cams 160, 180 due to the non-rotatably coupling of the inner and outer cams 160, 180.

Release of the compression force allows the biasing force to reverse the direction of movement of the pin rod dowel 76 causing the pin rod dowel 76 to move toward and engage the outer cam mating end ramps 188. Due to the sloping surfaces 192 of the outer cam mating end ramps 188, such movement causes further rotation of the inner and outer cams 160, 180 until the pin rod dowel 76 is aligned with the cam slot 194. The biasing force applied by the compression spring 232 then withdraws the pin rod dowel 76 from the cam interior 172 through the cam slot 194 such that the coat hook 12 is placed in the extended position 106.

Referring still to FIG. 4, the catch assembly 120 may further include a plurality of ball bearings 108 disposed adjacent to the proximal end 16. The ball bearings 108 are preferably spatially distributed about a perimeter of the button bore 148 and are captured between the button bottom surface 108 and the inner cam 160 mating end. Such ball bearings 108 may minimize friction with the bearing end 166 of the inner cam 160 during rotation thereof within the button bore 148. A disc-shaped cam spacer 106 may preferably be concentrically nested within the ball bearings 108 and disposed against the button bottom surface 108.

Sized at a thickness that is generally less than a diameter of any one of the ball bearings 108, the cam spacer 106 is configured to maintain the spatial distribution of the ball bearings 102 about the button bore 148. The cam spacer 106 may have a cam bore 162 formed therethrough for receiving the pin rod shaft 62. In order to capture the inner and outer cams 160, 180 within the button bore 148, a retainer ring 140 may be inserted into a button annular groove 144 formed circumferentially about the button bore 148. A cam washer 142 may also be disposed against the cam washer 142 on a side opposite that of the outer cam 180. The cam washer 142 may provide a suitable surface against which the compression spring 232 may bear.

Axial movement of the button assembly 90 within the latch assembly 20 may be limited by including a pair of diametrically opposed housing slots 46 formed within the latch housing 22. As shown in FIG. 4, the housing slots 46 are preferably aligned with the latch axis A. A corresponding pair of coiled pins 234 may be included with the button housing 92. The coiled pins 234 may extend laterally outwardly from button dowel holes 146 formed in the button housing 92. The coiled pins 234 are sized and configured to slidably engage the housing slots 46 and are preferably of a length that prevents protrusion into the button bore 148. The combination of the coiled pins 234 slidably engaged within the housing slots 46 prevents rotation of the button assembly 90 relative to the latch assembly 20 as well as limiting axial movement of the button assembly 90. The coiled pins 234 may be formed of rolled sheet material which may be frictionally fit into receiving holes in the button assembly 90. Alternatively, pins of solid material may be used.

The button assembly 90 further includes a button flange 98 sized and configured to be received within the housing counterbore 38 when the coat hook 12 is in the stowed position 104. Preferably, the housing counterbore 38 of the latch housing 22 and the button flange 98 are sized and configured such that the button flange 98 is flush with the housing shoulder outer surface 34 when the coat hook 12 is in the stowed position 104. Marking indicia may be included on the button flange 98 such as in the form of a coat hanger (not shown) which may be engraved or formed on an exterior surface of the button flange 98.

Referring now to FIGS. 15–20, the door latch 14 embodiment will now be described with occasional reference to the above mentioned descriptions of the catch assembly 120 and latch assembly 20. The door latch 14 embodiment is selectively moveable between latched and unlatched positions 56, 58 and has opposing proximal and distal ends 16, 18 with the latch axis A extending therebetween. The latch assembly 20 of the door latch 14 embodiment is configured similar to the latch assembly 20 of the push-to-open latch 10 with the exception of the latch assembly 20 including the pin rod support member 78 and the housing sleeve 210.

As was earlier mentioned, the combination of the pin rod support member 78 and the housing sleeve 210 minimizes the hazards otherwise posed by protrusion of the dowel rod assembly 60 outwardly from the mounting surface when the latch assembly 20 is completely decoupled from the catch assembly 120 such as occurs, for example, when the door of the cabinet is opened so as to expose the latch assembly 20. Furthermore, when the door is opened, the compression spring 232 also acts to fling or push the door away from the cabinet such that the door may then be grasped by the user for further opening.

Referring more particularly now to FIGS. 15–17, shown is the latch assembly 20 of the door latch 14 embodiment illustrating the latch housing 22, pin rod support member 78, a hollow housing sleeve 210 and dowel rod assembly 60 that make up the latch assembly 20. The latch housing 22 is configured similar to that described above for the push-to-open latch 10 wherein the latch housing 22 has the open housing bore 36 which extends to the housing bottom wall 26. However, as opposed to the push-to-open latch 10, the pin rod dowel 76 is indirectly secured to the latch housing 22 through the pin rod support member 78 which is shown as a generally cylindrical shaped member rigidly mounted to the housing bottom wall 26 in a manner similar to that described above for the dowel rod assembly 60 of the push-to-open latch 10. More specifically, the pin rod support member 78 includes a pin rod counterbore 68 to enable the pin rod support member 78 to be securely mounted by splaying out a portion of the pin rod support member 78 which protrudes through the pin rod mounting hole 42.

The pin rod support member 78 extends upwardly from the housing bottom wall 26 and has a shaft bore 220 formed therein open at the proximal end 16. A rotatable pin rod shaft 62 is axially fixed within the shaft bore 220 by means of an off-center pin 82 that engages an annular shaft groove 80 formed circumferentially about the pin rod shaft 62. In this manner, the pin rod shaft 62 is angularly rotatable but is axially fixed relative to the pin rod support member 78 and, hence, relative to the latch housing 22. The pin rod shaft 62 extends out of the shaft bore 220 and has the pin rod dowel 76 protruding laterally outwardly from diametrically opposed sides of the pin rod shaft 62 at the proximal end 16 similar to that described above for the push-to-open latch 10.

A hollow housing sleeve 210 is concentrically mounted over the pin rod support member 78 by means of a cylindrical sleeve bore 212 formed in the housing sleeve 210, as shown in FIG. 15–17. The housing sleeve 210 is axially moveable relative to the pin rod support member 78. The housing sleeve 210 includes a sleeve aperture 218 formed therein and through which the pin rod shaft 62 protrudes. Adjacent the proximal end 16, the housing sleeve 210 includes a hemi-spherical surface 216 that is engagable with the catch housing 122 in a manner as will be described below. Concentrically formed within the hemi-spherical surface 216 is a sleeve counterbore 214 within which the pin rod dowel 76 may nest when disengaged from the catch assembly 120. Nesting of the pin rod dowel 76 within the sleeve counterbore 214 further mitigates the hazards otherwise posed by the pin rod dowel 76 to nearby persons or property that may otherwise snag on the pin rod dowel 76 when the latch assembly 20 is completely decoupled from the catch assembly 120.

Referring still to FIG. 15–17, shown is a catch assembly 120 of the door latch 14 embodiment which is the structural equivalent of the catch assembly 120 for the push-to-open latch 10. The door latch 14 embodiment incorporates the inner and outer cam 160, 180 in the same manner as was earlier described for the catch assembly 120 of the push-to-open latch 10 and the coat hook 12 embodiment. However, the catch assembly 120 of the door latch 14 embodiment has the catch bore 124 open at the proximal end 16. The catch housing 122 extends to catch bottom wall 128 at the distal end 18. A catch housing aperture 134 is formed within the catch bottom wall 128 and is sized such that the pin rod dowel 76 may pass therethrough and into the cam slot 194 of the outer cam 180. In order to better seat the hemispherical surface 216 of the housing sleeve 210 against the catch housing 122, a bevel or catch countersink 132 may be circumferentially extended about the catch housing aperture 134.

The inner and outer cams 160, 180 are freely rotatable within the catch bore 124 and are confined therein by the retainer ring 140 which is engaged within an annular groove formed within the catch bore 124. A washer may be included between the retainer ring 140 and the bearing end of the inner cam 160 in order to facilitate free rotation of the inner cam 160 bearing end 166 thereagainst. The outer cam 180 is captured between the inner cam 160 and the catch bottom wall 128 and is non-rotatably coupled by means of the projections 198 and receiving apertures 170 such that the inner and outer cams 160, 180 rotate in unison when the inner and outer cam mating end ramps 168, 188 are engaged by the pin rod dowel 76 in the same manner as was earlier described for the coat hook 12 embodiment and the push-to-open latch 10.

Importantly, the compression spring 232 is captured between the housing bottom wall 26 and the housing sleeve 210 and is configured to apply the biasing force to bias the housing sleeve 210 away from the latch housing 22. As was earlier mentioned, such biasing force aligns the pin rod dowel 76 with the notch 196 during the initial reciprocative cycle. In addition, the biasing force aligns the pin rod dowel 76 with the slot during the subsequent reciprocative cycle and acts to fling or push the catch assembly 120 and, hence, the door away from the cabinet so that the user may more fully open the door.

In order to facilitate mounting of the door latch 14 to the cabinet, at least one, but more preferably, an opposed pair of latch housing flanges 50 may be included with the latch assembly 20 such as by integrally machining thereinto. The latch housing flanges 50 preferably extend outwardly from the latch housing 22 in general alignment with the latch axis A. The latch housing flanges 50 are preferably configured such that the latch assembly 20 may be mounted on a generally planar mounting surface such as on a cabinet frame. Each one of the latch housing flanges 50 may include a mounting hole 52 and/or a mounting slot 54 for extending mechanical fasteners such as screws through the latch housing flanges 50 and into the mounting surface. The mounting slots 54 may facilitate mounting and adjustment of the latch assembly 20 relative to the catch assembly 120.

Likewise, the catch assembly 120 may includes at least one and, preferably, a pair of catch housing flanges 134 extending outwardly from the catch housing 122 such that the catch housing 122 may be mounted on a planar surface such as an interior surface of the cabinet door. Mounting holes 52 and/or mounting slots 54 may be included to facilitate mounting and adjustment of the catch assembly 120 relative to the latch assembly 20. As shown in FIG. 18–20, the catch housing flanges 134 are preferably oriented normal to the latch axis A.

The operation of the coat hook 12 will now be described with reference to FIGS. 1–14. Starting in the extended position 106, the user may move the button assembly 90 inwardly into the stowed position 104 by applying a compression force sufficient to overcome the biasing force of the compression spring 232. Such compression force causes axial movement of the inner and outer cams 160, 180 relative to the dowel rod assembly 60 such that the pin rod dowel 76 is moved into direct engagement with the outer cam bearing end ramps 190. Regardless of the initial angular positions of the pin rod dowel 76 relative to the slot, initial alignment of the pin rod dowel 76 with the slot is facilitated by the sloping surfaces 192 of the outer cam bearing end ramps 190 which are configured to rotate the inner and outer cams 160, 180 until the cam slot 194 is aligned with the pin rod dowel 76 upon advancement of the pin rod shaft 62 into the cam bore 162 whereupon the pin rod dowel 76 may then enter the cam interior 172.

During such initial reciprocative cycle (i.e., an inward stroke followed by an outward stroke) of the button assembly 90, the compression force is manually applied by the user to cause the pin rod dowel 76 to enter the cam interior 172 and move toward and engage the sloping surfaces 192 of the inner cam mating end ramps 170 causing an approximate forty-five degree rotation of the inner and outer cams 160, 180 relative to the pin rod dowel 76. Release of the compression force allows the biasing force to reverse direction of the button assembly 90 and move the pin rod dowel 76 toward and engage the outer cam mating end ramps 188. Such relative movement causes a further approximate forty-five degrees of rotation of the inner and outer cams 160, 180 relative to the pin rod dowel 76 until the pin rod dowel 76 engages the notch 196 which then places the coat hook 12 in the stowed position 104. In the stowed position 104, the button flange 98 is preferably nested within the housing counterbore 38 so as to be substantially flush with the housing shoulder 30.

The coat hook 12 can then be moved to the extended position 106 during a second reciprocative cycle wherein the user again applies the compression force to the button assembly 90. Such compression force overcomes the biasing force of the compression spring 232 in order to axially disengage the pin rod dowel 76 from the notch 196 and move the pin rod dowel 76 toward and engage with the sloping surfaces 192 of the inner cam mating end ramps 170. Such engagement causes an additional forty-five degrees of rotation of the inner and outer cams 160, 180 relative to the pin rod dowel 76.

Release of the compression force allows the biasing force of the compression spring 232 to cause the button assembly 90 to again reverse direction and move toward and engage the sloping surfaces 192 of the outer cam mating end ramps 188. Such engagement causes an additional forty-five degrees of rotation of the inner and outer cams 160, 180 until the pin rod dowel 76 is aligned with the cam slot 194. Once aligned with the cam slot 194, the biasing force of the compression spring 232 withdraws the pin rod dowel 76 from the cam interior 172 through the cam slot 194 in order to place the push-to-open latch 10 in the extended position 106. In the extended position 106, the user may hang a coat from the button assembly 90.

The operation of the door latch 14 will now be described with reference to FIGS. 15–20. Starting in the unlatched position 58, the user may move the door and, hence, the catch assembly 120 inwardly toward the latch assembly 20 until the catch housing 122 contacts the hemi-spherical surface 216 of the housing sleeve 210. Applying the compression force sufficient to overcome the biasing force of the compression spring 232 causes axial movement of the housing sleeve 210 relative to the pin rod dowel 76 while simultaneously causing movement of the inner and outer cams 160, 180 relative to the pin rod dowel 76 such that the pin rod dowel 76 is moved into direct engagement with the outer cam bearing end ramps 190. In the same manner as was described for the coat hook 12, the pin rod dowel 76 is aligned with the cam slot 194 such that the pin rod dowel 76 may then enter the cam interior 172.

Continuing application of the compression force upon the door causes the pin rod dowel 76 to enter the cam interior 172 and move toward and engage the sloping surfaces 192 of the inner cam mating end ramps 170 causing the forty-five degree rotation of the inner and outer cams 160, 180 relative to the pin rod dowel 76. Because the pin rod shaft 62 is only axially fixed within the pin rod support member 78, the pin rod dowel 76 may also rotate relative to the inner and outer cams 160, 180. Release of the compression force reverses direction of the catch assembly 120 moving the pin rod dowel 76 toward and into engagement with the outer cam mating end ramps 188 resulting in a further approximate forty-five degrees of rotation of the inner and outer cams 160, 180 relative to the pin rod dowel 76 until the pin rod dowel 76 engages the notch 196 which then places the door latch 14 in the latched position 56. In the latched position 56, the housing sleeve 210 is in contact with the catch bottom wall 128.

The door latch 14 can then be moved to the unlatched position 58 during the second reciprocative cycle wherein the user again applies the compression force to the door in order to axially disengage the pin rod dowel 76 from the notch 196 and engage the inner cam mating end ramps 170 causing an additional forty-five degrees of rotation of the inner and outer cams 160, 180 relative to the pin rod dowel 76. Release of the compression force causes the housing sleeve 210 to push outwardly against the catch housing 122 which moves the pin rod dowel 76 toward and into engagement with the outer cam mating end ramps 188 causing an additional forty-five degrees of relative rotation of the inner and outer cams 160, 180. Such rotation continues until the pin rod dowel 76 is aligned with the cam slot 194 whereupon the pin rod dowel 76 is withdrawn from the cam interior 172 through the cam slot 194 in order to place the door latch 14 in the unlatched position 58. Simultaneously, the biasing force applied to the housing sleeve 210 forces the catch housing 122 and, hence, the door, outwardly such that the user may then grasp the door for further opening thereof.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A door latch selectively moveable between latched and unlatched positions along a latch axis, the door latch having opposing proximal and distal ends and comprising:
    a latch assembly, including:
        a latch housing having a housing bore open at the proximal end and extending to a housing bottom wall at the distal end; and
        a pin rod support extending upwardly from the housing bottom wall and having a rod bore formed therein and being open at the proximal end;
        a hollow housing sleeve mounted over the pin rod support and axially moveable relative thereto, the housing sleeve including a shaft bore formed therethrough;
        a rotatable pin rod shaft axially fixed within the rod bore and extending thereout through the shaft bore, the pin rod shaft having a pin rod dowel extending laterally outwardly from the pin rod shaft at the proximal end; and
    a catch assembly selectively engagable to the latch assembly and including:
        a catch housing having a catch bore open at the proximal end and extending to a catch bottom wall at the distal end;
        a rotatable inner cam having a mating end and a bearing end axially fixed within the catch bore adjacent the proximal end, the mating end having inner cam mating end ramps formed thereon; and
        a rotatable outer cam axially fixed within the catch bore adjacent the housing bottom wall, the outer cam having a bearing end and a mating end with outer cam bearing and mating end ramps being formed respectively thereon, the outer cam mating end ramps including a notch formed therewith, the inner and outer cams being coupled at respective ones of the mating ends such that the inner and outer cams rotate in unison within the catch bore, the inner and outer cam mating ends collectively defining a cam interior, the outer cam having a cam bore and a cam slot extending axially through the outer cam for passage of the pin rod shaft and pin rod dowel therethrough;
    a compression spring captured between the housing bottom wall and the housing sleeve and configured to apply a biasing force to bias the housing sleeve away from the latch housing;
    wherein:
        the inner and outer cam mating end ramps are configured to effectuate incremental rotation of the inner and outer cams relative to the pin rod dowel when the catch assembly is initially axially moved toward and reciprocated relative to the latch assembly such that the pin rod dowel passes through the cam slot, enters the cam interior and engages the notch in order to place the door latch in the latched position;

the inner and outer cam mating end ramps being configured to effectuate further incremental rotation of the pin rod dowel relative to the inner and outer cams when the catch assembly is further reciprocated relative to the latch assembly such that the pin rod dowel disengages from the notch during withdrawal of the pin rod dowel from the cam interior through the cam slot in order to place the door latch in the unlatched position.

2. The door latch of claim 1 wherein:

the inner cam mating end ramps are configured as a set of four separate sloping surfaces equi-angularly spaced about the cam bore and sloping in a generally circumferential direction;

the outer cam mating end ramps are configured as a set of four separate sloping surfaces equi-angularly spaced about the cam bore and sloping in a generally circumferential direction identical to that of the inner cam mating end ramps;

the set of inner cam sloping surfaces being angularly offset from the set of outer cam sloping surfaces by about forty-five degrees.

3. The door latch of claim 1 wherein the cam slot and notch are angularly offset by about ninety degrees.

4. The door latch of claim 1 wherein the catch bore further includes a retainer ring disposed therewithin at the proximal end for axially retaining the inner cam within the catch bore.

5. The door latch of claim 1 wherein the latch assembly includes at least one latch housing flange extending outwardly from the latch housing and being generally aligned with the latch axis.

6. The door latch of claim 1 wherein the catch assembly includes at least one catch housing flange extending outwardly from the catch housing, the catch housing flange being oriented generally normal to the latch axis.

* * * * *